(12) United States Patent
Yamamoto

(10) Patent No.: US 11,398,100 B2
(45) Date of Patent: Jul. 26, 2022

(54) IMAGE ANALYSIS METHOD AND IMAGE ANALYSIS DEVICE FOR IDENTIFYING MUSICAL INFORMATION

(71) Applicant: YAMAHA CORPORATION, Hamamatsu (JP)

(72) Inventor: Kazuhiko Yamamoto, Hamamatsu (JP)

(73) Assignee: YAMAHA CORPORATION, Shizuoka (JP)

(*) Notice: Subject to any disclaimer, the term of this patent is extended or adjusted under 35 U.S.C. 154(b) by 109 days.

(21) Appl. No.: 16/852,596

(22) Filed: Apr. 20, 2020

(65) Prior Publication Data
US 2020/0250420 A1    Aug. 6, 2020

Related U.S. Application Data

(63) Continuation of application No. PCT/JP2018/037850, filed on Oct. 11, 2018.

(30) Foreign Application Priority Data

Oct. 18, 2017    (JP) ............................. JP2017-201939

(51) Int. Cl.
*G06K 9/46*    (2006.01)
*G06V 30/418*    (2022.01)
(Continued)

(52) U.S. Cl.
CPC ......... *G06V 30/418* (2022.01); *G06K 9/6215* (2013.01); *G06V 10/40* (2022.01)

(58) Field of Classification Search
CPC .... G06K 9/00483; G06K 9/46; G06K 9/6215; G06V 30/418; G06V 10/40;
(Continued)

(56) References Cited

U.S. PATENT DOCUMENTS 8,586,849 B1 * 11/2013 Smith .................... G09B 15/00
                                                          84/477 R
9,478,201 B1 * 10/2016 Begelfor .............. G10H 1/0033
(Continued)

FOREIGN PATENT DOCUMENTS

CN    103198318 A    7/2013
JP    H06110945 A    4/1994
(Continued)

OTHER PUBLICATIONS

OnNote: A Musical Interface Using Markerless Physical Scores, Yusuke Yamamoto et al., 978-1-4503-0921-9/11/0008, Aug. 7, 2011, p. 1 (Year: 2011).*

(Continued)

*Primary Examiner* — Jayesh A Patel
(74) *Attorney, Agent, or Firm* — Chip Law Group

(57) ABSTRACT

Disclosed is an image analysis method implemented by a computer, the method including analyzing a partial image which is a part of an image of a planar subject, generating partial-image analysis data representing a characteristic of the partial image, comparing, for each of a plurality of images, candidate-image analysis data with the partial-image analysis data, the candidate-image analysis data representing a characteristic of each of the plurality of images, and selecting a candidate image among the plurality of images, the candidate image including a part corresponding to the partial image.

9 Claims, 4 Drawing Sheets

(51) Int. Cl.
*G06K 9/62* (2022.01)
*G06V 10/40* (2022.01)

(58) Field of Classification Search
CPC .. G06V 10/462; G06V 30/304; G06V 10/759; G06V 10/507; G06V 30/412; G06T 1/00; G06T 7/00
See application file for complete search history.

(56) References Cited

U.S. PATENT DOCUMENTS

| | | | | |
|---|---|---|---|---|
| 9,747,876 | B1* | 8/2017 | Clarke | G10H 1/0008 |
| 10,102,834 | B2* | 10/2018 | Pinuela | G10H 1/40 |
| 10,665,124 | B2* | 5/2020 | Wen | G09B 15/023 |
| 10,699,390 | B2* | 6/2020 | Yamamoto | G06T 5/006 |
| 2002/0189425 | A1* | 12/2002 | Hiratsuka | G09B 15/02 84/477 R |
| 2004/0139843 | A1* | 7/2004 | Forster | G09B 15/02 84/483.2 |
| 2007/0289432 | A1* | 12/2007 | Basu | G10H 7/008 84/609 |
| 2009/0158915 | A1* | 6/2009 | Ishii | H04N 1/2384 358/488 |
| 2009/0202106 | A1* | 8/2009 | Hong | G06V 10/273 455/556.1 |
| 2010/0313737 | A1* | 12/2010 | Fahn | G06K 9/00 84/477 R |
| 2012/0247305 | A1* | 10/2012 | Katsuta | G09B 15/023 84/477 R |
| 2013/0014896 | A1 | 1/2013 | Shoji et al. | |
| 2013/0284000 | A1* | 10/2013 | Sasaki | G10H 1/0008 84/609 |
| 2020/0250420 | A1* | 8/2020 | Yamamoto | G06V 10/507 |
| 2021/0056303 | A1* | 2/2021 | Yamamoto | G06K 9/6215 |

FOREIGN PATENT DOCUMENTS

| | | | | |
|---|---|---|---|---|
| JP | 2013125281 | A | 6/2013 | |
| JP | 2013228508 | A * | 11/2013 | G10H 1/0008 |
| JP | 2013228508 | A | 11/2013 | |
| JP | 2016200883 | A | 12/2016 | |
| KR | 2014081212 | A * | 7/2014 | |

OTHER PUBLICATIONS

Staff Line Removal Using Line Adjacency Graph and Staff Line Skeleton for Camera-Based Printed Music Scores, IEEE, 10.1109/ICPR.2014.480, 2014, pp. 2787-2789 (Year: 2014).*
Towards Score Following in Sheet Music Images, Matthias Dorfer et al., arXiv, Dec. 15, 2016, pp. 1-7 (Year: 2016).*
Sheet Music-Audio Identification, Christian Fremerey et al., ISMIR, 2009, pp. 645-650 (Year: 2009).*
Live Score Following on Sheet Music Images, Matthias Dorfer et al., arXiv, Dec. 15, 2016, pp. 1-2 (Year: 2016).*
International Search Report and Written Opinion in PCT/JP2018/037850 dated Dec. 25, 2018.
Yamamoto, Yusuke, "A Proposal on a Markerless Recognition of Physical Scores for onNote", IPSJ SIG Technical Report 2010(6).
Notice of Reasons of Refusal in JP 2017-201939 dated Aug. 25, 2021.
Decision of Refusal in JP 2017-201939 dated Apr. 1, 2022.

* cited by examiner

US 11,398,100 B2

IMAGE ANALYSIS METHOD AND IMAGE ANALYSIS DEVICE FOR IDENTIFYING MUSICAL INFORMATION

The present disclosure contains subject matter related to that disclosed in Japanese Priority Patent Application JP 2017-201939 filed in the Japan Patent Office on Oct. 18, 2017, the entire content of which is hereby incorporated by reference.

BACKGROUND

The present disclosure relates to a technology of analyzing an image obtained by imaging a sheet of a musical score or a book.

A technology of searching for a musical piece desired by a user has been proposed in the past. Japanese Patent Laid-Open No. H06-110945, for example, discloses a technology of retrieving a musical piece including a time series of notes sequentially specified by the user from a plurality of candidates.

SUMMARY

Under the technology of Japanese Patent Laid-Open No. H06-110945, the user needs to have musical knowledge for specifying the notes of the desired musical piece, and thus, situations in which the desired musical piece can be retrieved are actually limited. Incidentally, while the retrieval of a musical piece has been illustrated in the above description, a similar problem can occur also in a case of retrieving a document (for example, a book) including a character string desired by a user, for example. In view of the above circumstances, it is desirable that a preferred mode of the present disclosure identifies information desired by a user easily.

In order to solve the above problems, according to a preferred mode of the present disclosure, there is provided an image analysis method including: generating partial-image analysis data representing a characteristic of a partial image obtained by imaging a part of a planar subject by analyzing the partial image; and selecting a candidate image including a part corresponding to the partial image among a plurality of candidate images by comparing, for each of the plurality of candidate images, candidate image analysis data representing a characteristic of the candidate image with the partial-image analysis data.

According to a preferred mode of the present disclosure, there is provided an image analysis device including: an analysis processing module configured to generate partial-image analysis data representing a characteristic of a partial image obtained by imaging a part of a planar subject by analyzing the partial image; and an identification processing module configured to select a candidate image including a part corresponding to the partial image among a plurality of candidate images by comparing, for each of the plurality of candidate images, candidate image analysis data representing a characteristic of the candidate image with the partial-image analysis data.

According to a preferred mode of the present disclosure, there is provided a program for a computer, including: by an analysis processing module, generating partial-image analysis data representing a characteristic of a partial image obtained by imaging a part of a planar subject by analyzing the partial image; and by an identification processing module, selecting a candidate image including a part corresponding to the partial image among a plurality of candidate images by comparing, for each of the plurality of candidate images, candidate image analysis data representing a characteristic of the candidate image with the partial-image analysis data.

DETAILED DESCRIPTION OF THE PREFERRED EMBODIMENTS

First Embodiment

Figure 1:
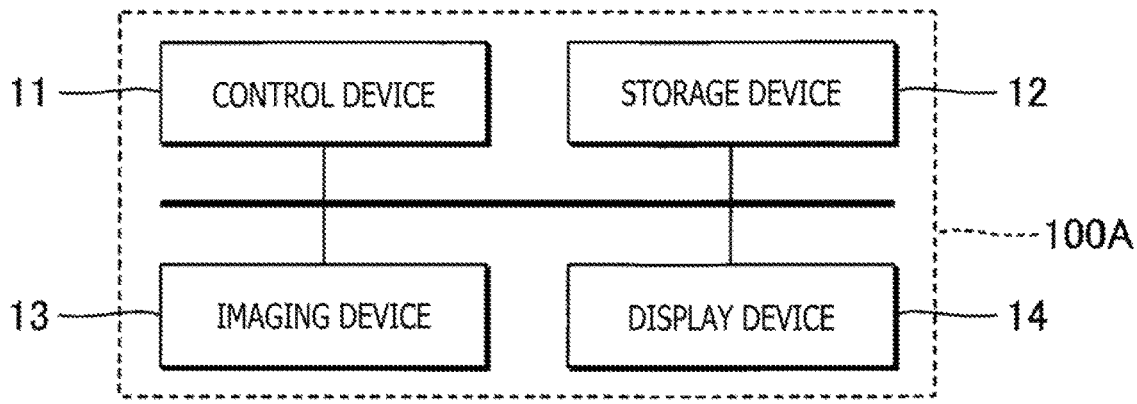
FIG. 1 is a block diagram depicting a configuration of an image analysis device according to a first embodiment of the present disclosure.

FIG. 1 is a block diagram illustrating a configuration of an image analysis device 100A according to a first embodiment of the present disclosure. As illustrated in FIG. 1, the image analysis device 100A according to the first embodiment is implemented by a computer system including an electronic controller 11, a storage device 12, an imaging device 13, and a display 14. The term "electronic controller" as used herein refers to hardware that executes software programs. The image analysis device 100A is a portable information terminal or a stationary information terminal. The portable information terminal, for example, is a mobile phone, a smart phone. The stationary information terminal, for example, is a personal computer.

The imaging device 13 is an image input apparatus for capturing an image. The imaging device 13 includes an imaging element that converts incident light from a subject into an electric signal. Specifically, the imaging device 13 generates image data representing the subject within an imaging range corresponding to an angle of view of an optical system of an imaging lens or the like. Incidentally, the format of the image data is freely selected. In addition, while the first embodiment illustrates a configuration in which the imaging device 13 is included in the image analysis device 100A, an imaging device 13 separate from the image analysis device 100A can be connected to the image analysis device 100A by wire or wirelessly.

Figure 2:
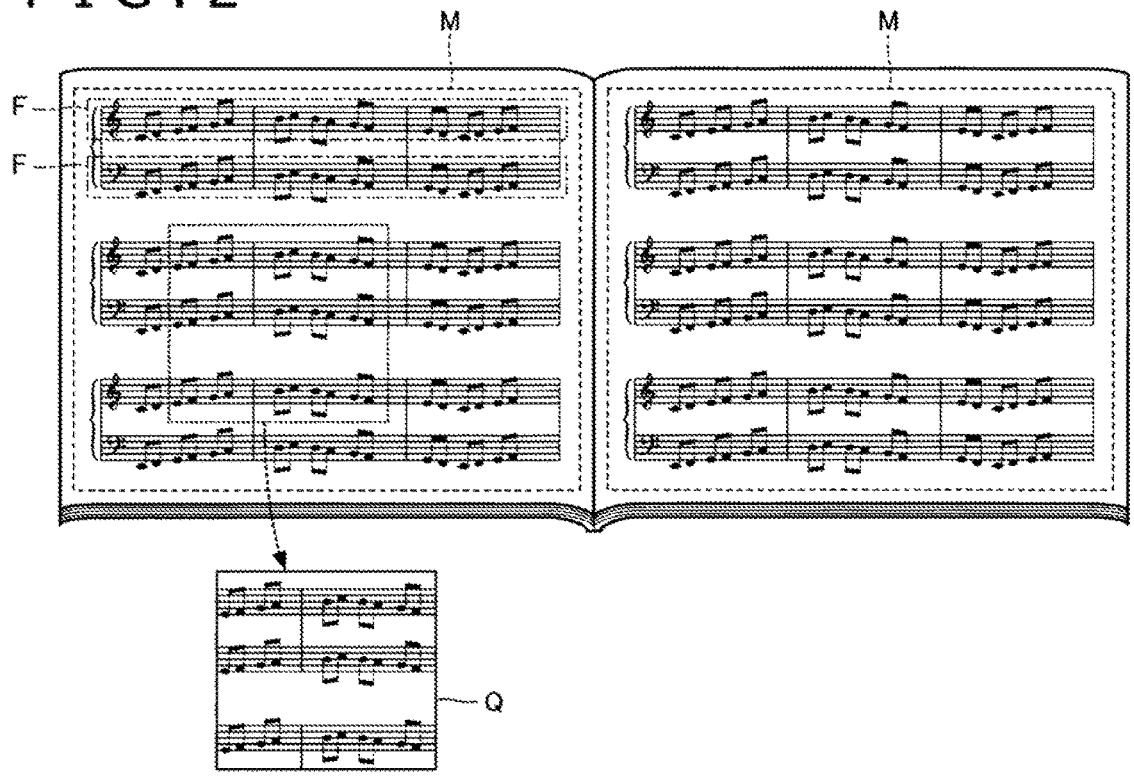
FIG. 2 is a diagram of assistance in explaining a partial musical score.

The imaging device 13 according to the first embodiment images a musical score M of an arbitrary musical piece according to an instruction from a user. As illustrated in FIG. 2, the first embodiment assumes a case where the imaging device 13 images a part (hereinafter referred to as a "partial musical score") Q within the imaging range in the whole of the musical score M printed on a sheet. The image analysis device 100A according to the first embodiment searches a plurality of images each depicting one page of the musical score (which images will hereinafter be referred to as "candidate musical scores") for a candidate musical score including a part corresponding to the partial musical score Q (which candidate musical score will hereinafter be referred to as a "target musical score"). Specifically, a target musical score including a part similar to or matching the partial musical score Q is retrieved. As is understood from the above description, the image analysis device 100A according to the first embodiment retrieves a candidate musical score of the same musical piece as the partial musical score Q imaged by the imaging device 13 as the target musical score from the plurality of candidate musical scores.

As illustrated in FIG. 2, the musical score M imaged by the imaging device 13 includes a plurality of staves F (specifically staff notation) arranged in parallel with each other in a vertical direction so as to be spaced from each other. Each of the plurality of staves F is formed by a plurality of horizontal straight lines indicating pitches different from each other. A plurality of musical score elements including a clef such as a G clef, an F clef, or the like and symbols such as notes, rests, or the like are arranged on each of the plurality of staves F. The partial musical score Q (an example of a partial image) is an image within a range including a part of the staves F of the musical score M.

The display 14 displays various kinds of images under control of the electronic controller 11. For example, the display is a liquid crystal display panel or an organic electroluminescence (EL) display panel. The storage device 12 stores a program executed by the electronic controller 11 and various kinds of data used by the electronic controller 11. Publicly known recording media such as a semiconductor recording medium, a magnetic recording medium, and the like or a combination of a plurality of kinds of recording media, for example, can be adopted as the storage device 12 in a freely selected manner.

Figure 3:
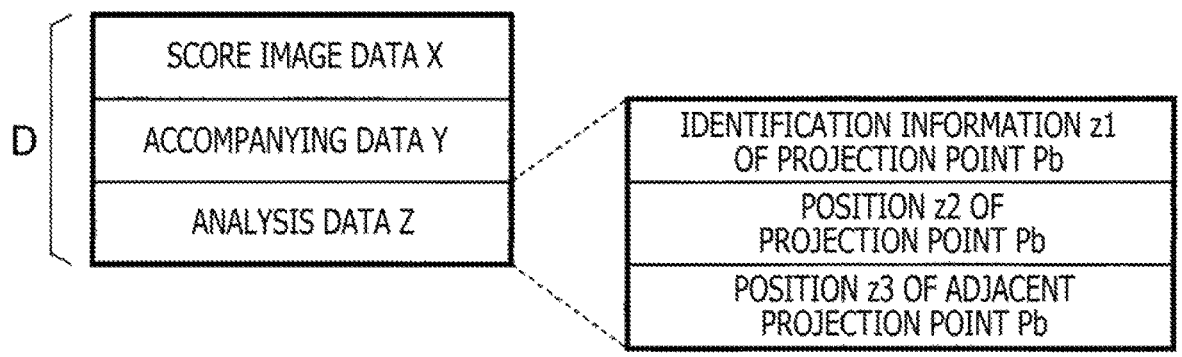
FIG. 3 is a schematic diagram of musical score data.

The storage device 12 according to the first embodiment stores, for each of a plurality of musical pieces, a plurality of pieces of musical score data D corresponding to candidate musical scores different from each other (that is, each corresponding to one page of the musical score). As illustrated in FIG. 3, one given piece of musical score data D includes musical score image data X, accompanying data Y, and analysis data Z.

The musical score image data X is image data representing a candidate musical score. For example, image data in a given format such as a PDF format (portable document format) or the like is used as the musical score image data X. The accompanying data Y is ancillary data related to the candidate musical score. For example, the accompanying data Y specifies information (for example, the title of a musical piece) for identifying the musical piece corresponding to the candidate musical score and the number of a page indicated by the candidate musical score among a plurality of pages constituting the musical score of the musical piece. Incidentally, for example, information for identifying a book (musical score collection) including the musical score corresponding to the candidate musical score can be included in the accompanying data Y. The analysis data Z is data indicating characteristics of one page of the musical score which page is represented by the candidate musical score.

Figure 4:
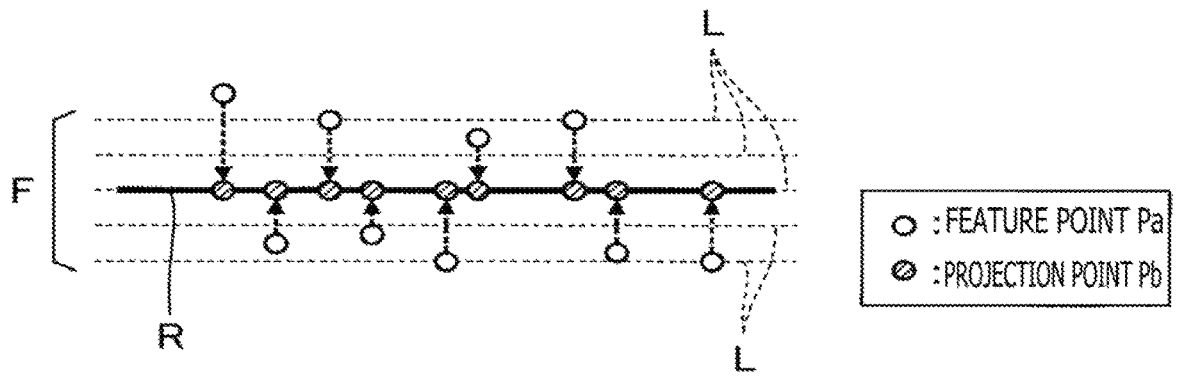
FIG. 4 is a diagram of assistance in explaining analysis data.

FIG. 4 is a schematic diagram of assistance in explaining the analysis data Z (an example of candidate image analysis data) of the candidate musical score. As described earlier with reference to FIG. 2, a plurality of staves F and a plurality of musical score elements (clefs or symbols) are arranged on each page of the musical score M. FIG. 4 illustrates a plurality of feature points Pa (that is, characteristic points on the image) extracted from the musical score M and a reference line R along a plurality of straight lines L constituting a staff F. A projection point Pb in FIG. 4 is a point obtained by projecting one feature point Pa onto the reference line R (specifically, orthogonal projection of the feature point Pa onto the reference line R). That is, the projection point Pb is a point of intersection of a line perpendicular to the reference line R which line passes through one feature point Pa and the reference line R (foot of the perpendicular line). The analysis data Z according to the first embodiment is vector data representing a set of a plurality of projection points Pb (that is, a point group) corresponding to feature points Pa extracted from the musical score M and different from each other. The analysis data Z corresponding to each of the plurality of staves F included in one page of the musical score M is included in the musical score data D. As is understood from the above description, the analysis data Z of the candidate musical score is data representing a result of projection of the feature points Pa extracted from the candidate musical score onto the reference line R.

As illustrated in FIG. 3, the analysis data Z includes, for each of the plurality of projection points Pb, identification information (for example, a number) $z1$ of the projection point Pb in question, a position (coordinates) $z2$ of the projection point Pb in question, and identification information $z3$ (=$z1$) of one or more projection points Pb located in the vicinity of the projection point Pb in question. As is understood from the above description, the identification information $z3$ of one or more projection points Pb in the vicinity of each projection point Pb is registered, and thus, there is an advantage of being able to easily grasp mutual positional relation between a plurality of projection points Pb corresponding to one staff F.

Figure 5:
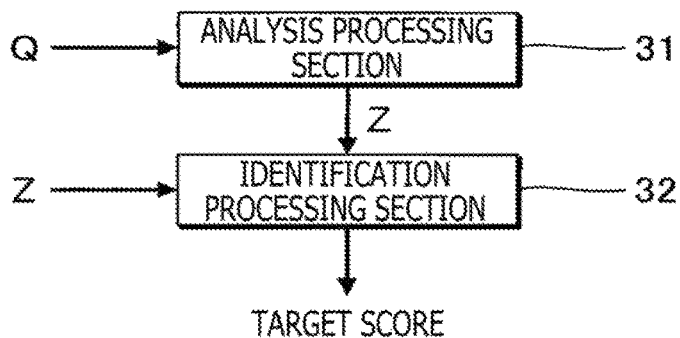
FIG. 5 is a block diagram depicting a functional configuration of a electronic controller.

The electronic controller 11 in FIG. 1 includes a processing circuit, such as a central processing unit (CPU) having at least one processor. The electronic controller 11 controls each element of the image analysis device 100A. As illustrated in FIG. 5, the electronic controller 11 according to the first embodiment implements a plurality of module (an analysis processing module 31 and an identification processing module 32) for searching for a target musical score including a part corresponding to the partial musical score Q imaged by the imaging device 13 by executing the program stored in the storage device 12. Incidentally, the functions of the electronic controller 11 can be implemented by a set of a plurality of devices (that is, a system), or a part or the whole of the functions of the electronic controller 11 can be implemented by a dedicated electronic circuit.

The analysis processing module 31 generates analysis data Z representing characteristics of the partial musical score Q (an example of partial-image analysis data) by analyzing the partial musical score Q imaged by the imaging device 13. The identification processing module 32 selects a candidate musical score including a part corresponding to the partial musical score Q as a target musical score by mutually comparing each of a plurality of pieces of analysis data Z stored in the storage device 12 for the candidate musical scores different from each other with the analysis data Z generated by the analysis processing module 31.

Figure 6:
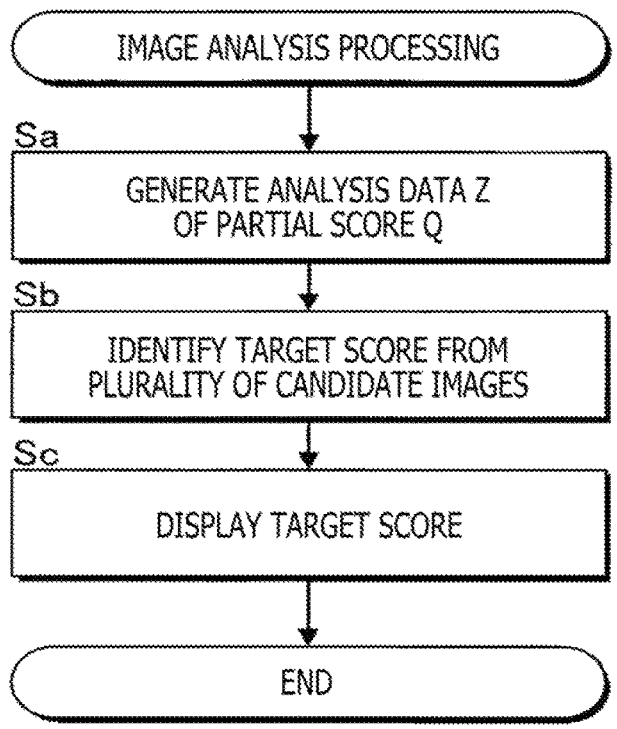
FIG. 6 is a flowchart illustrating an outline of image analysis processing.

FIG. 6 is a flowchart illustrating a schematic procedure of processing in which the electronic controller 11 identifies a target musical score from a partial musical score Q (which processing will hereinafter be referred to as "image analysis processing"). The image analysis processing is performed each time the imaging device 13 images a partial musical score Q, for example. Hence, in a case where a moving image constituted by a time series of a plurality of partial musical scores Q is imaged, the image analysis processing of FIG. 6 is sequentially performed for each partial musical score Q to identify a target musical score.

When the image analysis processing is started, the analysis processing module 31 generates analysis data Z by analyzing the partial musical score Q (Sa). As will be described below in detail, the identification processing module 32 selects a candidate musical score including a part corresponding to the partial musical score Q among the plurality of candidate musical scores as a target musical score by mutually comparing each of the plurality of pieces of analysis data Z stored in the storage device 12 for the candidate musical scores different from each other with the analysis data Z generated by the analysis processing module 31 (Sb). The identification processing module 32 displays an image of the target musical score on the display 14 (Sc).

Figure 7:
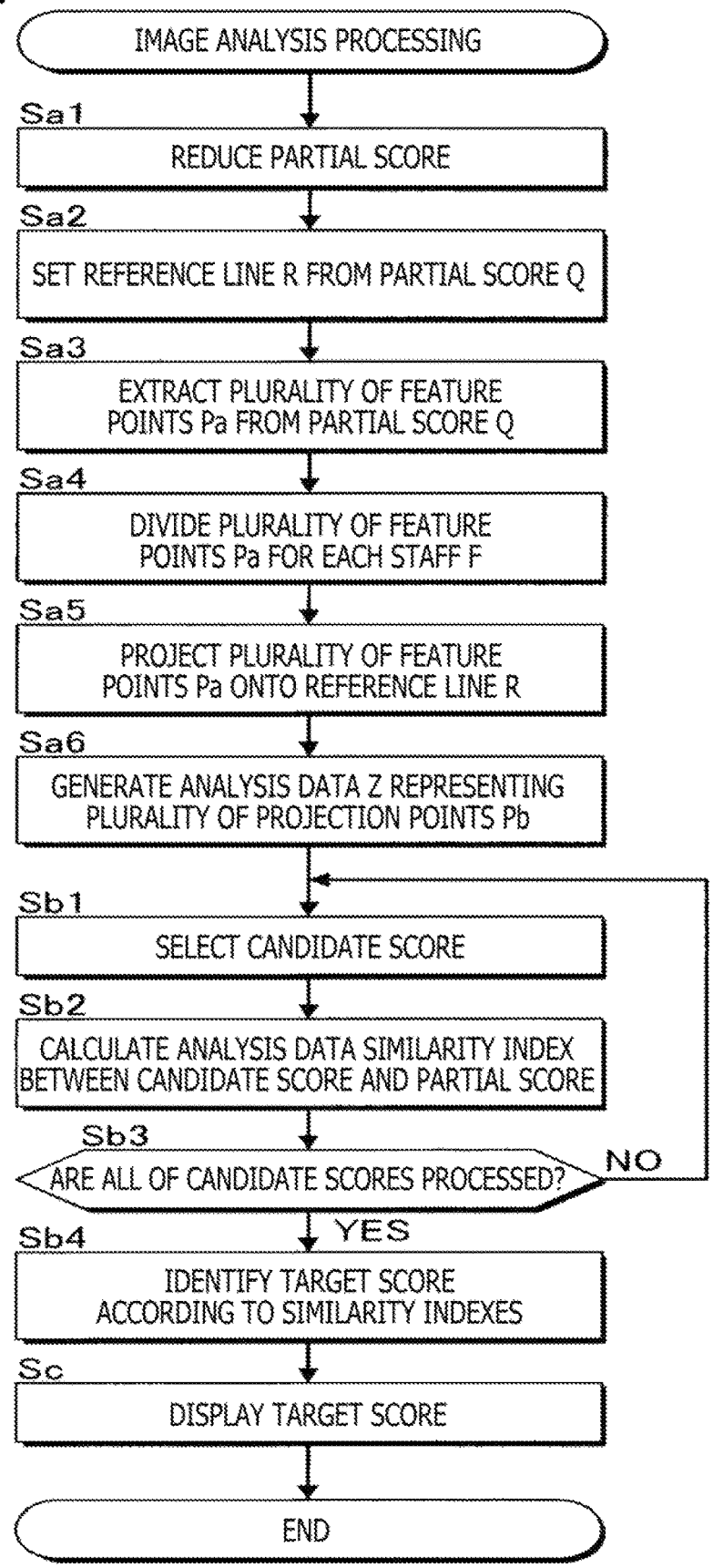
FIG. 7 is a flowchart illustrating a specific procedure of the image analysis processing.

FIG. 7 is a flowchart illustrating a specific procedure of the image analysis processing illustrated in FIG. 6. The processing Sa of analyzing the partial musical score Q includes reduction processing Sa1, setting processing Sa2, extraction processing Sa3, division processing Sa4, projection processing Say, and generation processing Sa6. The reduction processing Sa1 is processing of reducing the partial musical score Q. A publicly known image reducing technology is adopted as the reduction processing Sa1 in a freely selected manner. Incidentally, the reduction processing Sa1 can be omitted.

The analysis processing module 31 sets the reference line R for the partial musical score Q imaged by the imaging device 13 (setting processing Sa2). Specifically, the analysis processing module 31 extracts each straight line L constituting a staff F from the partial musical score Q, and sets the reference line R parallel with the plurality of straight lines L. For example, the analysis processing module 31 divides the plurality of straight lines L in a horizontal direction which straight lines are extracted from the partial musical score Q for each staff F (clustering), and sets the reference line R that passes through a middle point of the staff F in the vertical direction and extends in the horizontal direction along each straight line L of the staff F. As is understood from the above description, the electronic controller 11 functions as an element (reference line setting module) that sets the reference line R corresponding to the straight lines L included in the partial musical score Q.

The analysis processing module 31 extracts a plurality of feature points Pa from the partial musical score Q imaged by the imaging device 13 (extraction processing Sa3). A publicly known image analyzing technology such as a scale-invariant feature transform (SIFT), speeded up robust features (SURF), KAZE Features (KAZE), accelerated KAZE (AKAZE), or the like is adopted in a freely selected manner for the extraction of the feature points Pa. As is understood from the above description, the electronic controller 11 functions as an element (feature point extracting module) that extracts the plurality of feature points Pa from the partial musical score Q. Incidentally, the order of the setting processing Sa2 and the extraction processing Sa3 can be reversed.

The analysis processing module 31 divides the plurality of feature points Pa extracted in the extraction processing Sa3 into a plurality of sets (cluster) for each staff F (division processing Sa4). A publicly known classifying technology (clustering) is adopted for the division processing Sa4 in a freely selected manner. The division processing Sa4 can be omitted in a case where the partial musical score Q includes only one staff F.

After the above processing (Sa1 to Sa4) is completed, the analysis processing module 31 identifies a plurality of projection points Pb by projecting the plurality of feature points Pa onto the reference line R for each staff F included in the partial musical score Q (projection processing Sa5). That is, the analysis processing module 31 identifies the plurality of projection points Pb by orthogonally projecting each of a plurality of feature points Pa extracted in the extraction processing Sa3 from one arbitrary staff F and the vicinity thereof onto the reference line R set in the setting processing Sa2. As is understood from the above description, the electronic controller 11 functions as an element (feature point projecting module) that projects the plurality of feature points Pa onto the reference line R.

The analysis processing module 31 generates analysis data Z representing the plurality of projection points Pb identified in the projection processing Say (generation processing Sa6). That is, the electronic controller 11 functions as an element (generation processing module) that generates the analysis data Z representing each feature point Pa after projection (that is, the projection points Pb). A specific example of the processing (Sa1 to Sa6) in which the analysis processing module 31 generates the analysis data Z by analyzing the partial musical score Q is as described above. Incidentally, the analysis data Z of each candidate musical score is generated by performing the processing (Sa1 to Sa6) illustrated above for the candidate musical score, and is stored in the storage device 12.

After the analysis processing module 31 generates the analysis data Z of the partial musical score Q by the above processing Sa, the identification processing module 32 performs the processing Sb in FIG. 6 (Sb1 to Sb4), which processing selects a candidate musical score including a part corresponding to the partial musical score Q among the plurality of candidate musical scores as a target musical score by mutually comparing each of the plurality of pieces of analysis data Z stored in the storage device 12 for the candidate musical scores different from each other with the analysis data Z generated by the analysis processing module 31, as will be described below in detail. FIG. 7 illustrates a specific procedure (Sb1 to Sb4) of the processing Sb in FIG. 6.

The identification processing module 32 selects one of the plurality of candidate musical scores (Sb1), and calculates a similarity index between the analysis data Z of the candidate musical score and the analysis data Z of the partial musical score Q (Sb2). The similarity index is an index indicating a degree of similarity between the analysis data Z of the candidate musical score and the analysis data Z of the partial musical score Q. A given index indicating a distance or a correlation between two vectors is suitable as the similarity index. The following description assumes a case where the higher the similarity between the analysis data Z of the candidate musical score and the analysis data Z of the partial musical score Q, the larger the numerical value of the similarity index.

The identification processing module 32 determines whether or not similarity indexes between all of the candidate musical scores and the partial musical score Q have been calculated (Sb3). When there is a candidate musical score for which the similarity index is not calculated (Sb3: NO), the identification processing module 32 selects the unselected candidate musical score anew, and thereafter calculates the similarity index between the analysis data Z of the candidate musical score and the analysis data Z of the partial musical score Q (Sb2).

After the identification processing module 32 calculates the similarity indexes for all of the candidate musical scores by repeating the processing illustrated above (Sb3: YES), the identification processing module 32 selects a candidate musical score whose similarity index is a maximum among the plurality of candidate musical scores as the target musical score (Sb4). That is, a candidate musical score including a part corresponding to the partial musical score Q among the plurality of candidate musical scores is identified as the target musical score. The identification processing module 32 obtains the musical score data D of the target musical score from the storage device 12, and displays, on the display 14, an image of the target musical score represented by the musical score image data X of the musical score data D and information (the title of a musical piece and a page number) indicated by the accompanying data Y of the musical score data D (Sc).

As described above, the first embodiment selects the target musical score including a part corresponding to a partial image by analyzing the partial musical score Q obtained by imaging a part of the musical score M. Hence, the target musical score can be identified from images obtained when the user captures various regions of the musical score M, for example. In addition, there is an advantage of being able to identify the target musical score with high accuracy by comparing the analysis data Z representing the projection points Pb obtained by projecting the feature points Pa of the musical score onto the reference line R between the partial musical score Q and the candidate musical scores.

Second Embodiment

Figure 8:
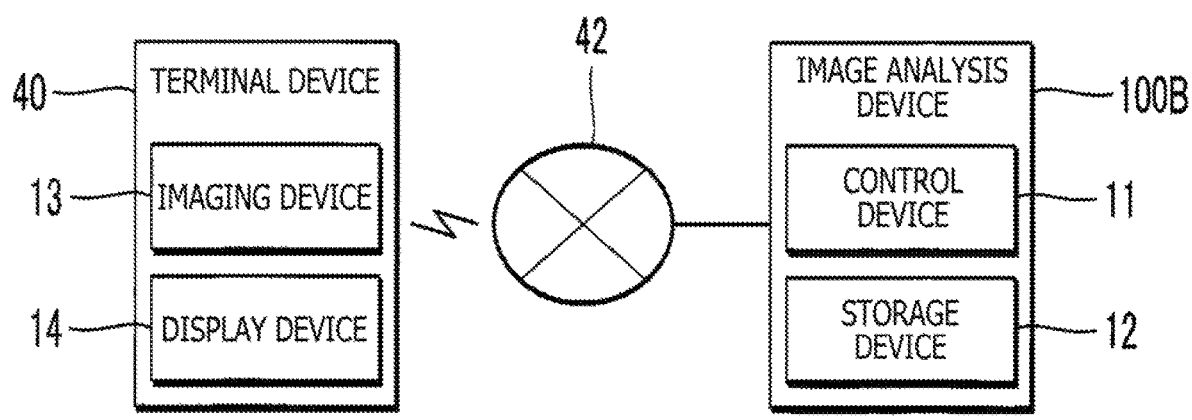
FIG. 8 is a block diagram depicting a configuration of an image analysis device according to a second embodiment.

FIG. 8 is a block diagram depicting a configuration of an image analysis device 100B in a second embodiment of the present disclosure. The image analysis device 100B according to the second embodiment is implemented by a server device (for example, a Web server) that can communicate with a terminal device 40 via a communication network 42 including a mobile communication network and the Internet or the like. The terminal device 40 includes an imaging device 13 and a display 14. As in the first embodiment, the imaging device 13 images a partial musical score Q as a part of a musical score M, and the display 14 displays a musical score (for example, a target musical score) represented by musical score image data X.

Image data representing the partial musical score Q imaged by the imaging device 13 is transmitted from the terminal device 40 to the image analysis device 100B. The image analysis device 100B receives the image data transmitted from the terminal device 40, and selects the target musical score including a part corresponding to the partial musical score Q represented by the image data among a plurality of candidate musical scores. Specifically, the image analysis device 100B includes a electronic controller 11 and a storage device 12 similar to those of the first embodiment. The storage device 12 stores a plurality of pieces of musical score data D corresponding to the candidate musical scores different from each other. The electronic controller 11 performs the image analysis processing of FIG. 7 which processing identifies the target musical score from the partial musical score Q. The musical score image data X and the accompanying data Y of the target musical score identified by the electronic controller 11 are transmitted to the terminal device 40. The display 14 of the terminal device 40 displays an image of the musical score represented by the musical score image data X and information (for example, the title of a musical piece and a page number) indicated by the accompanying data Y. The second embodiment also realizes effects similar to those of the first embodiment. Incidentally, as is understood from the illustration of the second embodiment, display of the image of the target musical score by the image analysis device 100B itself (processing Sc in FIG. 6) is omitted.

<Modifications>

Modes of specific modifications added to each mode illustrated above will be illustrated in the following. Two or more modes freely selected from the following illustration can be integrated with each other as appropriate within a scope where no mutual inconsistency arises.

(1) In each embodiment described above, a straight line parallel with each straight line L constituting a staff F is identified as the reference line R. However, a method of identifying the reference line R is not limited to the above illustration. For example, the user can specify the reference line R. In addition, in a case where an edge of a sheet including the musical score M is included in the partial musical score Q, for example, the reference line R along the edge can be set.

(2) In each embodiment described above, a configuration has been illustrated in which the analysis data Z related to each of the plurality of candidate musical scores is stored in the storage device 12 in advance. However, the analysis data Z of the candidate musical scores can be generated by analyzing the candidate musical scores in a stage of a search for the target musical score (before the analysis of the partial musical score Q, for example). For example, the electronic controller 11 (analysis processing module 31) generates the analysis data Z of the candidate musical scores by performing the analysis processing (Sa1 to Sa6) of FIG. 7 on each candidate musical score represented by the musical score image data X. The processing (Sb1 to Sb4) in which the identification processing module 32 identifies the target musical score by comparing the analysis data Z (an example of candidate image analysis data) of the candidate musical score with the analysis data Z of the partial musical score Q is similar to that of each embodiment described above.

(3) In each embodiment described above, the target musical score including a part corresponding to the partial musical score Q is identified. However, the field to which the present disclosure is applied is not limited to musical score searches. For example, the present disclosure can be applied to identify, from a partial image obtained by imaging a part of a document such as a book or the like, a candidate image (for example, corresponding to one page of the document) including the partial image. In a case where the partial image of the document such as a book or the like is analyzed, a straight line parallel with a direction in which a plurality of characters are arranged or a straight line specified by the user, for example, is suitable as the reference line R. According to the above configuration, it is possible to identify the entire document including a part corresponding to the partial image from the partial image obtained by imaging a part of the document. As is understood from the above description, a preferred mode of the present disclosure is an image analysis method that identifies a candidate image including a part corresponding to a partial image obtained by imaging a part of a planar subject (for example, a musical score or a document) among a plurality of candidate images by analyzing the partial image. The partial musical score described in each embodiment described above is an example of the "partial image," and the candidate musical scores described in each embodiment described above are an example of the "candidate images."

(4) In each embodiment described above, a configuration has been illustrated in which the musical score data D of a candidate musical score includes musical score image data X and accompanying data Y. However, the musical score data D can include only one of the musical score image data X and the accompanying data Y. Hence, the display 14 can display only one of an image of the target musical score represented by the musical score image data X and information (the title of a musical piece and a page number) indicated by the accompanying data Y.

(5) In each embodiment described above, a case has been illustrated in which the accompanying data Y includes both of the title of a musical piece and a page number. However, the information indicated by the accompanying data Y is not limited to the above illustration. For example, the accompanying data Y can indicate only one of the title of the musical piece and the page number. Hence, the display 14 can display only one of the title of the musical piece of the target musical score and the page number thereof.

(6) The image analysis device 100 (100A or 100B) according to each embodiment described above is implemented by cooperation between the electronic controller 11 and a program, as illustrated in each embodiment. The program according to each embodiment described above can be provided in a form of being stored on a recording medium readable by a computer, and installed on the computer. The recording medium is, for example, a non-transitory recording medium. An optical recording medium (optical disk) such as a compact disc read only memory (CD-ROM) or the like is a good example of the recording medium. However, the recording medium can include publicly known given types of recording media such as a semiconductor recording medium, a magnetic recording medium, and the like. It is to be noted that the non-transitory recording medium includes given recording media excluding transitory propagating signals, and does not exclude volatile recording media. In addition, the program can also be provided to a computer in a form of distribution via a communication network.

(7) The following configurations, for example, are grasped from the embodiments illustrated above.

An image analysis method according to a preferred mode (first mode) of the present disclosure analyzes a partial image obtained by imaging a part of a planar subject, and identifies a candidate image including a part corresponding to the partial image among a plurality of candidate images on the basis of a result of the analysis of the partial image. According to the above mode, the candidate image including a part corresponding to the partial image is identified on the basis of the analysis of the partial image obtained by imaging a part of the subject. It is therefore possible to identify the candidate image from various images captured by a user, for example.

In a preferred example (second mode) of the first mode, in analyzing the partial image, a plurality of feature points are extracted from the partial image, the plurality of feature points are projected onto a reference line, and partial-image analysis data representing each feature point after the projection is generated. In a preferred example (third mode) of the second mode, in identifying the candidate image, the candidate image including the part corresponding to the partial image is identified by comparing, for each of the plurality of candidate images, candidate image analysis data representing a result of projecting feature points extracted from the candidate image onto the reference line with the partial-image analysis data. In the above mode, the analysis data representing a result of projecting the plurality of feature points extracted from the partial image onto the reference line is compared with each of a plurality of pieces of analysis data corresponding to the candidate images different from each other. Hence, there is an advantage of being able to identify the candidate image including a part corresponding to the partial image with high accuracy.

In a preferred example (fourth mode) of the second mode or the third mode, in analyzing the partial image, the reference line corresponding to a straight line included in the partial image is set. In the above mode, the reference line corresponding to the straight line included in the partial image is set. There is thus an advantage of eliminating a need for the user to set the reference line, for example.

In a preferred example (fifth mode) of one of the first to fourth modes, the subject is a musical score. According to the above mode, a musical score including a part corresponding to a partial image obtained by imaging a part of the musical score can be identified from the partial image.

An image analysis device according to a preferred mode (sixth mode) of the present disclosure includes: an analysis processing module configured to generate partial-image analysis data representing a characteristic of a partial image obtained by imaging a part of a planar subject by analyzing the partial image; and an identification processing module configured to select a candidate image including a part corresponding to the partial image among a plurality of candidate images by comparing, for each of the plurality of candidate images, candidate image analysis data representing a characteristic of the candidate image with the partial-image analysis data.

In a preferred example (seventh mode) of the sixth mode, the analysis processing module extracts a plurality of feature points from the partial image, projects the plurality of feature points onto a reference line, and generates the partial-image analysis data representing each feature point after the projection. In a preferred example (eighth mode) of the seventh mode, the identification processing module selects the candidate image including the part corresponding to the partial image by comparing, for each of the plurality of candidate images, the candidate image analysis data representing a result of projecting feature points extracted from the candidate image onto the reference line with the partial-image analysis data. In a preferred example (ninth mode) of the seventh mode or the eighth mode, the analysis processing module sets the reference line corresponding to a straight line included in the partial image. In a preferred example (tenth mode) of one of the sixth to ninth modes, the subject is a musical score.

A program according to a preferred mode (eleventh mode) of the present disclosure, the program for a computer, including: by an analysis processing module, generating partial-image analysis data representing a characteristic of a partial image obtained by imaging a part of a planar subject by analyzing the partial image; and by an identification processing module, selecting a candidate image including a part corresponding to the partial image among a plurality of candidate images by comparing, for each of the plurality of candidate images, candidate image analysis data representing a characteristic of the candidate image with the partial-image analysis data.

It should be understood by those skilled in the art that various modifications, combinations, sub-combinations and alterations can occur depending on design requirements and other factors insofar as they are within the scope of the appended claims or the equivalent thereof.

What is claimed is:
1. An image analysis method implemented by a computer, the method comprising:
    analyzing a partial image which is a part of an image of a planar subject;

generating, based on the analysis of the partial image, partial-image analysis data representing a characteristic of the partial image;

comparing, for each of a plurality of images, candidate-image analysis data with the partial-image analysis data, wherein
the candidate-image analysis data representing a characteristic of each of the plurality of images,
the candidate-image analysis data includes a plurality of projection points, and
at least one projection point of the plurality of projection points is a point obtained by projection of at least one feature point of a plurality of feature points onto a reference line; and selecting, based on the comparison, a candidate image among the plurality of images, wherein the candidate image including a part corresponding to the partial image.

2. The image analysis method according to claim 1, wherein analyzing the partial image includes:
extracting the plurality of feature points from the partial image; and
projecting the plurality of feature points onto the reference line, and the partial-image analysis data represents the plurality of feature points after the projection.

3. The image analysis method according to claim 2, wherein the reference line corresponds to a straight line included in the partial image.

4. The image analysis method according to claim 1, wherein the planar subject is a musical score.

5. An image analysis device, comprising:
an electronic controller including at least one processor, the electronic controller being configured to execute a plurality of modules including:
an analysis processing module configured to:
analyze a partial image which is a part of an image of a planar subject; and
generate, based on the analysis of the partial image, partial-image analysis data representing a characteristic of the partial image; and
an identification processing module configured to:
compare, for each of a plurality of images, candidate-image analysis data with the partial-image analysis data, wherein
the candidate-image analysis data representing a characteristic of each of the plurality of images,
the candidate-image analysis data includes a plurality of projection points, and
at least one projection point of the plurality of projection points is a point obtained by projection of at least one feature point of a plurality of feature points onto a reference line; and
select, based on the comparison, a candidate image among the plurality of images, wherein the candidate image including a part corresponding to the partial image.

6. The image analysis device according to claim 5, wherein the analysis processing module is configured to:
extract the plurality of feature points from the partial image;
project the plurality of feature points onto the reference line; and
generate the partial-image analysis data representing the plurality of feature points after the projection.

7. The image analysis device according to claim 6, wherein the analysis processing module is configured to set the reference line corresponding to a straight line included in the partial image.

8. The image analysis device according to claim 5, wherein the planar subject is a musical score.

9. A non-transitory computer-readable storage medium storing a program for causing a computer to execute processing, comprising:
by an analysis processing module, analyzing a partial image which is a part of an image of a planar subject;
by the analysis processing module, generating partial-image analysis data representing a characteristic of the partial image based on the analysis of the partial image;
by an identification processing module, comparing, for each of a plurality of images, candidate-image analysis data with the partial-image analysis data, wherein
the candidate-image analysis data representing a characteristic of each of the plurality of images,
the candidate-image analysis data includes a plurality of projection points, and
at least one projection point of the plurality of projection points is a point obtained by projection of at least one feature point of a plurality of feature points onto a reference line; and
by the identification processing module, selecting, based on the comparison, a candidate image among the plurality of images, wherein the candidate image including a part corresponding to the partial image.

* * * * *